Patented Mar. 29, 1938

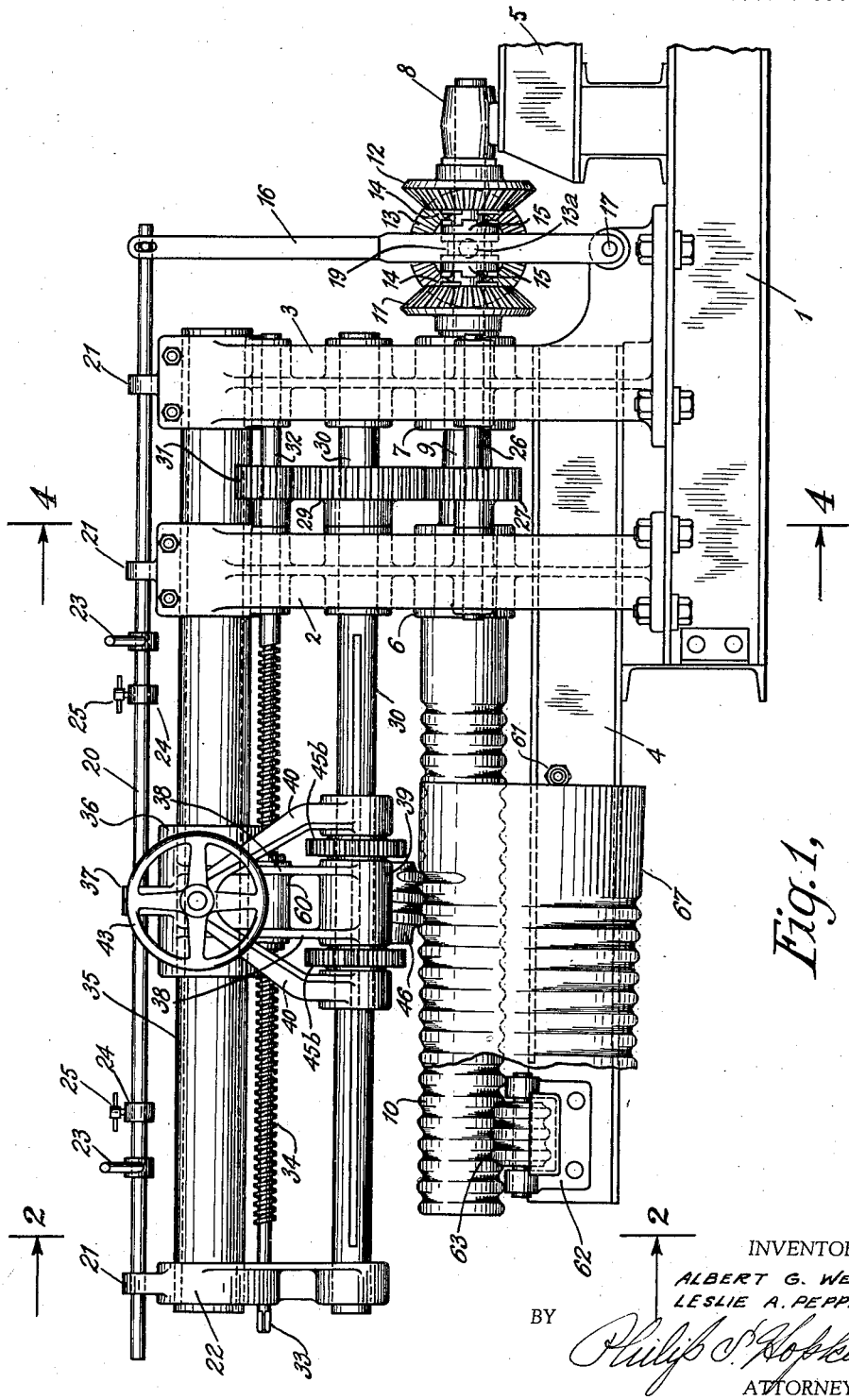

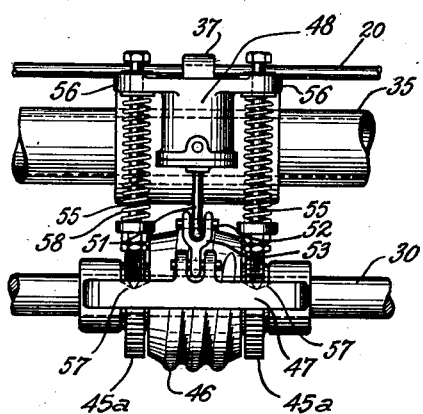
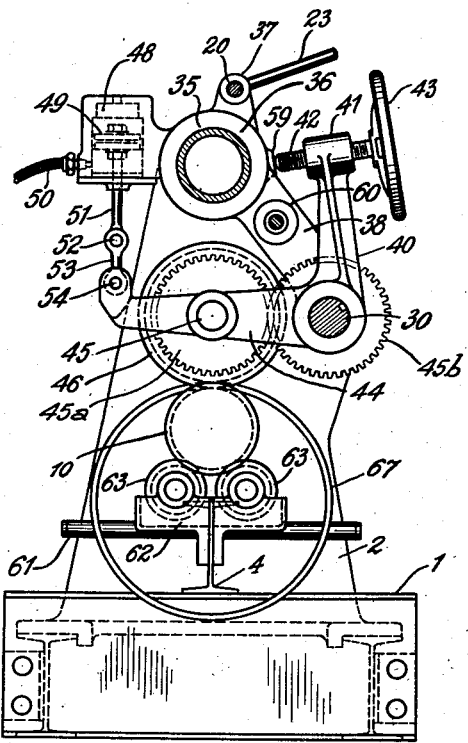
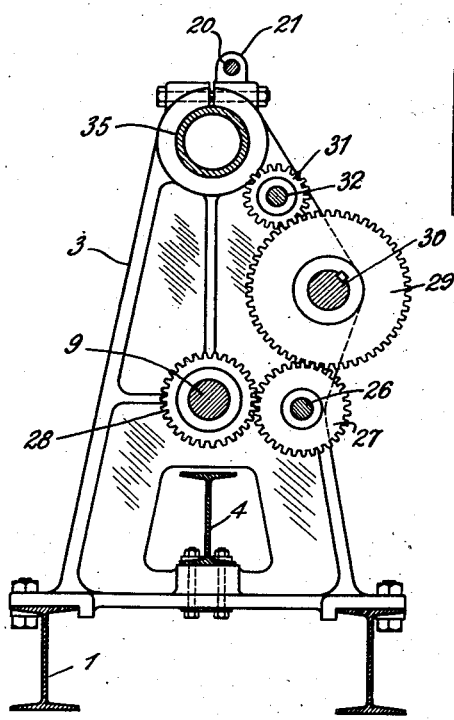

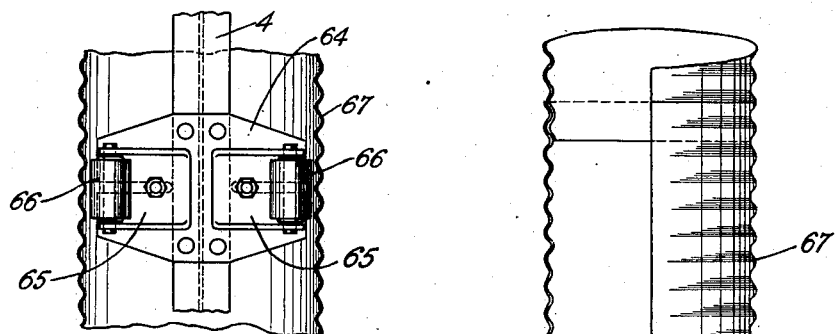
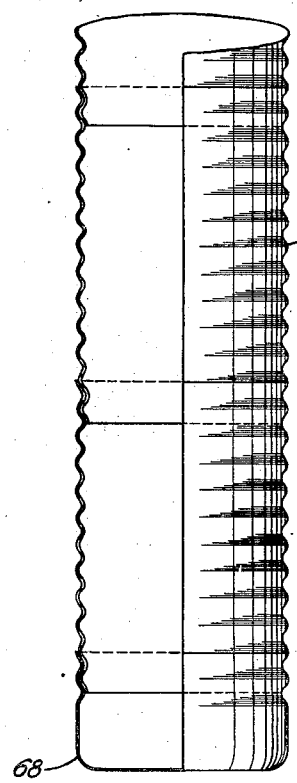
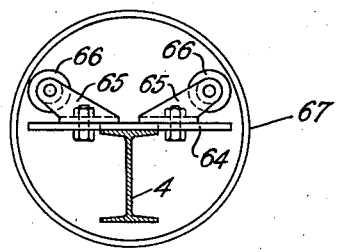
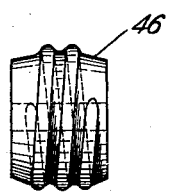
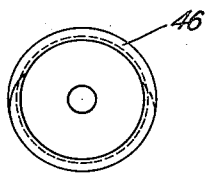
Fig. 5, Fig. 6, Fig. 7, Fig. 8, Fig. 9,
INVENTORS
ALBERT G. WERY,
LESLIE A. PEPPLER.
BY
ATTORNEY.

2,112,509

UNITED STATES PATENT OFFICE 2,112,509

APPARATUS FOR CORRUGATING CYLINDERS

Albert G. Wery, Endicott, and Leslie A. Peppler, New Brighton, Staten Island, N. Y.

Application December 12, 1935, Serial No. 54,104

15 Claims. (Cl. 153—73)

Our invention relates to an apparatus for corrugating cylinders and has for its primary object the provision of means for providing smooth, even regular circumferential corrugations in the thin walls of pipes or other metal cylinders such as are used for conduit, foundation pile casing, and other work.

One important object of our invention lies in the provision of a means whereby the cylinder can be loosely mounted and supported upon a mandrel provided with corrugations of the desired size and character, and a tracing or embossing tool adapted to engage the outside of the cylinder and press the wall thereof into such mandrel corrugations whereby the same are impressed upon the cylinder, the embossing tool traveling along the length of the cylinder and mandrel to form spaced circumferential corrugations in the wall of the cylinder.

Another object of our invention lies in the provision of means for reversing the direction of travel of the embossing tool so that the embossing can be done in both directions longitudinally of the cylinder.

Still another object of our invention is to provide a means for automatically stopping the embossing operation upon reaching a predetermined position with respect to the end of the cylinder.

Another object lies in the provision of means whereby the embossing tool can be quickly raised or lifted out of engagement with the cylinder and mandrel.

A further object lies in the provision of means engaging the inner wall of the cylinder during operation to prevent its lateral displacement.

Still another and important object lies in the provision of a means and method whereby one end of the cylinder is left uncorrugated to receive the end of a wholly uncorrugated cylinder or closed end boot and the corrugating process then continued over such overlapped ends whereby the same are corrugated together and the corrugations continued along the second named cylinder, thus providing a continuous corrugation through two or more sections of cylinders or through a cylinder section and the open end of a boot, and automatically providing means by such corrugations whereby said sections are secured together.

Other objects and advantages will be apparent as the description proceeds, reference now being had to the figures of the accompanying drawings forming a part of this application and wherein like reference numerals indicate like parts.

In the drawings:

Figure 1 is a side view of our apparatus.

Figure 2 is a partly sectional end view thereof taken on the line 2—2 of Figure 1.

Figure 3 is a detail rear view of the embossing tool and carriage and showing the lifting means therefor.

Figure 4 is a sectional end view of the apparatus taken on the line 4—4 of Figure 1.

Figure 5 is a detail view illustrating the interior of the cylinder and its relation to the cylinder supporting means.

Figure 6 is a detail sectional end view of the parts shown in Figure 5.

Figure 7 is a detail view partly in section of a plurality of sections of cylinders and end boot corrugated and secured together in accordance with this invention.

Figure 8 is a detail view of the side of the embossing tool.

Figure 9 is a detail end view of such tool.

The reference character 1 refers to a supporting base upon which are suitably rigidly secured the upstanding brackets 2 and 3 and also upon which is suitably secured the I beam supporting member 4. Another supporting bracket 5 is also suitably secured upon the base 1.

Suitably journaled in bearings 6 and 7 in the brackets 2 and 3 respectively, and in the bearing 8 on the bracket 5, is a mandrel shaft 9 provided with an extending circumferentially corrugated mandrel portion 10, the teeth of which are rounded and disposed in spaced parallel relation, on the mandrel.

The opposite end of the mandrel shaft 9 is reduced and is journaled at its extreme end in the bearing 8. Freely rotatable upon the mandrel shaft 9 is a pair of spaced, oppositely disposed bevel gears 11 and 12 meshing with a bevel gear 13 disposed at right angles thereto, and secured upon shaft 13a. Each of the gears 11 and 12 are provided with clutch faces 14 and splined upon the shaft 9 between the gears 11 and 12 are clutch members 15 adapted to selectively engage and drive either gear 11 or gear 12 or to occupy the neutral position shown in Figure 1. The clutch lever 16 is pivoted as at 17 on one end of the bracket 3 and this lever has suitable means, not shown, for engaging within a groove 19 in the clutch member whereby upon rocking the lever 16 in one direction or another said clutch will be slid along the shaft to engage either of the clutches 14 on the gears 11 and 12.

It will be clear that if the clutch member 15 engages the corresponding clutch member on the gear 11, the shaft 9 will be rotated in one direction. If the opposite clutch member 15 engages the corresponding clutch member on the gear 12, the shaft 9 will be rotated in the opposite direction. Also obviously, if the clutch lever 16 is in the neutral position shown in Figure 1, the gears 11 and 12 will rotate freely on the shaft 9 and consequently the said shaft with mandrel 10 will be at rest. Any suitable means, not shown, such as an electric motor, may be provided to drive the shaft 13a.

The upper end of the clutch lever 16 is pivotally connected to one end of a rod 20 slidably mounted in journals 21 formed on the tops of brackets 2 and 3 and on the top of a bracket 22 provided at the opposite end of the machine. Handles 23 are provided on the rod 20 at spaced points whereby an operator may conveniently reach and take hold of one of said handles and slide the rod longitudinally in either direction to actuate the clutch lever.

Adjustable collars 24 are also provided on the rod 20 and adapted to be set in selected positions and secured in such positions by the thumb screws 25. These collars serve as automatic clutch actuating means in a manner which will be described.

Also journaled in the brackets 2 and 3 at a point spaced from and parallel to the mandrel shaft 9 and in substantially the same plane therewith, is a shaft 26 carrying a pinion 27. This pinion meshes with a similar pinion 28 upon the mandrel shaft 9 (see Figure 4) and also meshes with a gear 29 upon a shaft 30 likewise journaled in the brackets 2 and 3. The opposite end of this splined shaft 30 projects beyond the bracket 2 and is disposed parallel with the mandrel 10, the extreme end being supported in the bracket 22. The gear 29 meshes with a pinion 31 on a shaft 32 also journaled in the brackets 2 and 3 and projecting beyond the bracket 2 and having its opposite end journaled in the bracket 22, the extreme end of such shaft being squared as at 33 to receive a wrench or other tool whereby the same may be rotated by hand. This shaft 32 is screw-threaded as at 34 for a purpose to be described.

Fixedly mounted at the upper ends of the brackets 2, 3 and 22, and extending longitudinally and parallel with the screw shaft 32, the shaft 30, and the mandrel 10, is a supporting cylinder 35 upon which is slidably mounted carriage 36 provided on its upper side with an apertured lug 37 through which passes the clutch rod 20. The carriage 36 is provided with downwardly extending supporting arms 38, the lower ends of which carry a bearing member 39 slidable upon the shaft 30.

Journaled upon the shaft 30 to pivot about the same in spaced relation on opposite sides of the carriage member 39, is a pair of bell crank arms, the upper legs 40 of which converge into a single threaded journal 41 through which is threadably mounted an adjusting screw 42 provided with a hand wheel 43 on its outer end. The opposite legs 44 of the bell crank levers (see Figure 2) extend angularly toward the rear of the machine above the mandrel 10 and support a fixed shaft 45 upon which is rotatably mounted the embossing tool 46. The extreme rear ends of the legs 44 are connected by a bar 47 (see Figure 3).

Also rotatably mounted upon the shaft 45 and secured, one at each end, to the embossing tool 46 are the gears 45a adapted to mesh with similar gears 45b splined upon the shaft 30 to rotate therewith and capable of sliding therealong. These gears 45b are disposed between the pivot points of the bell crank arms 40—40 and 44—44.

Carried upon the rear side of the carriage 36 (see Figure 2) is a cylinder housing 48 within which is disposed a plunger or piston 49. A source of air pressure 50 communicates with the interior of the housing below the piston whereby upon operation of a suitable valve by the operator to admit compressed air into such housing, the piston is forced upwardly. Connected to the piston 49 and projecting downwardly out of the housing 48 is a rod 51 having pivotal connection as at 52 with a link 53, the lower end of which is pivoted as at 54 to the tie rod 47.

Adjusting screws 55 project downwardly from a flange 56 on the upper side of the housing 48 and the lower end of such adjusting screws engage within recesses 57 in the tie bar 47. Coil springs 58 encircle the adjusting screws 55 whereby normally the bell crank arms 44 and the embossing tool 46 are forced downwardly into mandrel engaging position. Obviously however, if the operator admits air pressure into the housing 48 as described, the upward movement of the piston 49 will instantly lift the embossing tool above the mandrel. The embossing tool may also be raised above the mandrel, and its pressure against the mandrel adjusted by means of the adjusting screw 42 and hand wheel 43, the inner end of the screw 42 bearing against a lug 59 formed on the carriage 36.

The downwardly depending supporting arms 38 on the carriage 36 are provided with a threaded boss 60 through which passes the lead screw or threaded shaft 34, the threads thereof engaging the threads in said boss whereby rotation of the shaft serves to slide the carriage 36 and the embossing tool longitudinally of the mandrel 10.

The boss 37 on the carriage 36 serves to engage with one of the collars 24, depending upon the direction of travel, when a predetermined length of travel has been reached and move the clutch rod 20 longitudinally to actuate the clutch lever.

A section of pipe or cylinder shell is adapted to be loosely mounted upon the mandrel 10 as shown clearly in Figure 1, in position for the embossing tool 46 to engage thereagainst and for the spiral thread thereof to press the wall of the shell or cylinder into the corresponding corrugations of the mandrel 10 whereby to corrugate such wall. In a normal operation and with the mandrel and embossing tool rotating, the shell will be rolled around the mandrel and a circumferential corrugation formed therein. A fixed stop member 61 is attached on the supporting beam 4 against which the end of the shell engages.

At the outer end of the supporting beam 4 there is provided a suitable bracket 62 supporting a pair of bearing rollers 63 provided with teeth corresponding to the mandrel teeth and thus forming a roller bearing for the projecting end of the mandrel.

Also mounted upon the supporting beam 4 at a suitable point along the length thereof, is a supporting plate 64 upon which are disposed supporting brackets 65 (see Figure 6) carrying rollers 66 adapted to engage against the inner wall of the pipe or cylinder section 67 during the embossing operation and prevent the pipe from being forced to one side or the other of the mandrel by the action of the embossing tool.

In the embossing of the pipe the end thereof may be left uncorrugated for a short distance as shown in Figure 1, so as to receive an adjacent uncorrugated cylinder, and the overlapping or telescoping ends are then corrugated together as shown in Figure 7 whereby to secure such ends together and to provide a uniform corrugation throughout the length of one or a plurality of sections. These pipe sections are generally formed slightly tapered which facilitates this telescoping of adjacent ends.

In operation the carriage with the embossing tool is first adjusted longitudinally on the supporting members 30 and 35 to the desired position with respect to the mandrel for beginning the corrugating operation, this adjustment being made either by hand, by turning the lead screw 34 by means of a suitable tool engaging the squared end 33 thereof, or by power drive from drive shaft 13a, through either bevel gear 11 or 12, shaft 9, pinion 28, pinion 27, gear 29 and pinion 31. The rotation of the lead screw results in longitudinal sliding movement of the carriage 36 and bearing 39 along the supporting members 35 and 30, with consequent sliding and rotative movement of the embossing tool carried thereby. Obviously the corrugating operation may be begun at either end of the mandrel, the latter being rotatable in either direction, as above explained.

With the parts thus set, the embossing tool is raised above the mandrel, either by operating the hand wheel and screw 42 or by permitting air to enter the cylinder below the piston 49, resulting in rocking the bell crank arms 44 upwardly about their pivot 30 and carrying with them the shaft 45 and embossing tool 46.

An uncorrugated shell is now placed upon the mandrel 10 and slid inwardly on the same until the end of the shell engages to stop 61.

The embossing tool is now lowered into engagement with the shell and sufficient pressure is exerted by the coil springs 58, to cause the spiral of the embossing tool to press the wall of the shell or pipe into the corrugations of the mandrel. It may be explained here that the thread of the embossing tool is spirally disposed, so that as the corrugating proceeds, the embossing tool adopts a screw action in following the non-spiral grooves of the mandrel.

The collars 24 are now adjusted on the clutch rod 20 so as to be engaged by the boss 37 on the carriage 36 when such carriage has reached a predetermined position with respect to the end of the shell 67, preferably when the embossing tool has come within a short distance of the end of the shell.

With the drive shaft 13a rotating, the clutch rod is now actuated to cause rotation of the mandrel shaft 9, shaft 30 and lead screw 32, in the desired direction. The shell 67 rolls around the mandrel 10 between the said mandrel and the embossing tool and is corrugated in the manner shown, the embossing tool and carriage being simultaneously moved along by the lead screw 34. The shell is prevented from swinging outwardly or becoming displaced by means of the roller supports 66 engaging the inner wall thereof. The embossing tool and the mandrel rotate in opposite directions.

When the corrugating operation has reached the desired point adjacent the end of the shell section, the clutch 15 is moved into neutral position either manually by means of the handles 23 or automatically by the boss 37 engaging one of the collars 24, thus stopping the further rotation of the mandrel and embossing tool. Of course, in some instances, as desired, the corrugating of a section of shell may be carried to the extreme end thereof.

The embossing tool and carriage is now raised above the mandrel in the manner previously described and the shell removed from the mandrel, this removal being wholly unhindered and unimpaired by any part of the machine and requiring no other disconnection of parts. The section is simply lifted and pulled freely from the mandrel. Now, if desired, a new and uncorrugated section, or an end boot such as shown at 68 in Figure 7, may be engaged together at their ends by telescoping the said ends for a short distance, the normal taper usually provided on the shells making this a convenient and easy operation.

Assuming that the embossing or corrugating operation has proceeded from left to right in Figure 1, in the operation just described, the new shell is now placed upon the mandrel first, with its inner end engaging against the stop 61 and with its opposite joined end and the section just corrugated supported upon the mandrel. The embossing tool and its associated carriage are now lowered into engagement with the previously corrugated section adjacent the termination of the corrugations thereof and the clutch moved to drive the parts in the same direction as before. The corrugating proceeds as before through the overlapping ends of the two sections and continues until the end of the previously uncorrugated section or a predetermined point short of the end thereof has been reached. Thereupon the embossing tool and carriage are again raised, either manually or automatically by the other collar 24, causing the parts to stop. Obviously this can continue until as many sections of shell as desired are corrugated and secured together to the end or ends of the endmost sections.

By this means we have provided a relatively simple and inexpensive apparatus for corrugating cylinders or pipe shells of any diameter and for securing the ends of the same together.

Of course, changes may be made in details of construction and arrangement of parts without departing from the spirit and scope of our invention. We do not limit ourselves, therefore, other than by the appended claims.

We claim:

1. An apparatus for corrugating cylinders comprising a mandrel, means for supporting said mandrel horizontally and from one end only whereby the corrugating portion thereof is free to receive a cylinder section thereover without obstruction, an embossing tool supported in operative relation to said mandrel, said embossing tool comprising a shaft having fixed corrugating teeth thereon and means for rotating said tool and said mandrel to emboss parallel corrugations in the cylinder at right angles to the axis of said cylinder.

2. An apparatus for corrugating cylinders comprising a mandrel, means for supporting said mandrel horizontally and from one end only whereby the corrugating portion thereof is free to receive a cylinder section thereover without obstruction, an embossing tool supported in operative relation to said mandrel, said embossing tool comprising a shaft having fixed corrugating teeth thereon, means for rotating said tool and said mandrel, and means for causing said tool to travel longitudinally along said mandrel and a cylinder section thereon to emboss parallel corrugations in the cylinder at right angles to the axis of said cylinder.

3. An apparatus for corrugating cylinders comprising a mandrel, means for supporting said mandrel horizontally and from one end only whereby the corrugating portion thereof is free to receive a cylinder section thereover without obstruction, an embossing tool supported in operative relation to said mandrel, said embossing tool comprising a shaft having fixed corrugating teeth thereon, means for rotating said tool and said mandrel, and stop means for limiting the inward positioning of a cylinder section on said mandrel.

4. An apparatus for corrugating cylinders comprising a mandrel, means for supporting said mandrel horizontally and from one end whereby the corrugating portion thereof is free to receive a cylinder section thereover without obstruction, an embossing tool supported in operative relation to said mandrel, means for rotating said tool and said mandrel, means for causing said tool to travel longitudinally along said mandrel and a cylinder section thereon to emboss parallel corrugations in the cylinder at right angles to the axis of said cylinder, and means actuated by the travel of said tool for stopping the rotation of said tool and mandrel at a predetermined position of said tool.

5. An apparatus for corrugating cylinders comprising a mandrel, means for supporting said mandrel horizontally and from one end only whereby the corrugating portion thereof is free to receive a cylinder section thereover without obstruction, an embossing tool supported in operative relation to said mandrel, said embossing tool comprising a shaft having fixed corrugating teeth thereon, means for rotating said tool and said mandrel, and means for causing said tool to travel longitudinally along said mandrel and a cylinder section thereon to emboss parallel corrugations in the cylinder at right angles to the axis of said cylinder, selectively in either direction.

6. An apparatus for corrugating cylinders comprising a mandrel adapted to support a cylinder thereon, an embossing tool having fixed corrugating teeth thereon swingably mounted to selectively engage the wall of a cylinder on said mandrel, means for rotating said tool and mandrel and for simultaneously moving said tool longitudinally of said mandrel and cylinder to emboss parallel corrugations in the cylinder at right angles to the axis of said cylinder, and means for swinging and maintaining said tool away from said mandrel and cylinder.

7. An apparatus for corrugating cylinders comprising a mandrel adapted to support a cylinder thereon, an embossing tool swingably mounted to selectively engage the wall of a cylinder thereon, means for rotating said tool and mandrel, and for simultaneously moving said tool longitudinally of said mandrel and cylinder, and means for swinging said tool away from said mandrel and cylinder, said last named means comprising a fluid actuated device operatively connected with said tool.

8. An apparatus for corrugating cylinders comprising a mandrel adapted to support a cylinder thereon, an embossing tool swingably mounted to selectively engage the wall of a cylinder thereon, means for rotating said tool and mandrel and for simultaneously moving said tool longitudinally of said mandrel and cylinder, means for swinging said tool away from said mandrel and cylinder, said last named means comprising a fluid actuated device operatively connected with said tool, and independent manually operated means for adjusting said tool toward and away from said mandrel and cylinder.

9. An apparatus for corrugating cylinders comprising a mandrel adapted to support a cylinder thereon, a carriage swingably mounted and carrying an embossing tool adapted to be selectively moved with said carriage into and out of mandrel engaging position, means for rotating said tool and mandrel and for simultaneously moving said tool and carriage longitudinally of said mandrel, and fluid actuated means for quickly swinging said carriage and tool away from said mandrel.

10. An apparatus for corrugating cylinders comprising a supporting member, an elongated mandrel supported at one end thereon and projecting outwardly therefrom, a secondary supporting member supported at one end on said first member and projecting therefrom below and parallel to said projecting mandrel, means on said secondary support for engaging and rotatably supporting the free end of said mandrel, and an embossing tool operatively disposed with respect to said mandrel.

11. An apparatus for corrugating cylinders comprising a supporting member, an elongated mandrel supported at one end thereon and projecting outwardly therefrom, a secondary supporting member supported at one end on said first member and projecting therefrom below and parallel to said projecting mandrel, means on said secondary support for engaging and rotatably supporting the free end of said mandrel, and an embossing tool operatively disposed with respect to said mandrel, said projecting mandrel and secondary support being spaced above the first support whereby a cylinder can be freely inserted around said mandrel and secondary support without obstruction.

12. An apparatus for corrugating cylinders comprising a supporting member, an elongated mandrel supported at one end thereon and projecting outwardly therefrom, a secondary supporting member supported at one end on said first member and projecting therefrom below and parallel to said projecting mandrel, means on said secondary support for engaging and rotatably supporting the free end of said mandrel, an embossing tool operatively disposed with respect to said mandrel, said projecting mandrel and secondary support being spaced above the first support whereby a cylinder can be freely inserted around said mandrel and secondary support without obstruction, and means on said secondary support for engaging and supporting the inner wall of a cylinder thereon to prevent swinging thereof laterally of said mandrel.

13. An apparatus for corrugating cylinders comprising a mandrel adapted to receive a cylinder thereover, said mandrel having corrugating grooves therein spaced apart and parallel and at right angles to the periphery of the cylinder and the longitudinal axis of the mandrel, an embossing tool operatively mounted for engagement with the walls of a cylinder on said mandrel, said tool having corrugating teeth spirally arranged thereon and adapted to press the wall of the cylinder in said grooves, and means for rotating said mandrel and said tool.

14. An apparatus for corrugating cylinders comprising a mandrel adapted to receive a cylinder thereover, said mandrel having corrugating grooves therein spaced apart and parallel and at right angles to the periphery of the cylinder and the longitudinal axis of the mandrel, an embossing tool operatively mounted for engagement with the walls of a cylinder on said mandrel, said tool having corrugating teeth spirally arranged thereon and adapted to press the wall of the cylinder in said grooves, and means for rotating said mandrel and said tool in opposite directions.

15. An apparatus for corrugating cylinders comprising a mandrel adapted to receive a cylinder thereover, said mandrel having corrugating grooves therein spaced apart and parallel and at right angles to the periphery of the cylinder and the longitudinal axis of the mandrel, an embossing tool operatively mounted for engagement with the walls of a cylinder on said mandrel, said tool having corrugating teeth spirally arranged thereon and adapted to press the wall of the cylinder in said grooves, means for rotating said mandrel and said tool in opposite directions, and means for moving said tool longitudinally of said mandrel during the corrugating operation.

ALBERT G. WERY.
LESLIE A. PEPPLER.